(12) United States Patent
Suzuki et al.

(10) Patent No.: US 10,778,866 B2
(45) Date of Patent: Sep. 15, 2020

(54) IMAGE FORMING APPARATUS CONFIGURED TO EMBED ELECTRONIC INFORMATION IN ELECTRONIC EMBEDMENT AREAS OUTSIDE A PRINT GUARANTEE AREA, IMAGE FORMING METHOD, AND NON-TRANSITORY COMPUTER-READABLE STORAGE MEDIUM

(71) Applicants: Taito Suzuki, Kanagawa (JP); Takuya Hirotani, Kanagawa (JP)

(72) Inventors: Taito Suzuki, Kanagawa (JP); Takuya Hirotani, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 16/202,396

(22) Filed: Nov. 28, 2018

(65) Prior Publication Data

US 2019/0281184 A1 Sep. 12, 2019

(30) Foreign Application Priority Data

Mar. 8, 2018 (JP) .................................. 2018-042176

(51) Int. Cl.
*H04N 1/32* (2006.01)

(52) U.S. Cl.
CPC ..... *H04N 1/32288* (2013.01); *H04N 1/32293* (2013.01); *H04N 1/32304* (2013.01); *H04N 1/32325* (2013.01); *H04N 1/32352* (2013.01)

(58) Field of Classification Search
None
See application file for complete search history.

(56) References Cited

U.S. PATENT DOCUMENTS

| 2011/0133887 A1* | 6/2011 | Tian ..................... G06K 9/2063 340/5.86 |
| 2015/0116410 A1* | 4/2015 | Armbruster ........ G06K 15/1878 347/15 |
| 2016/0162762 A1* | 6/2016 | Maeda ................... B41J 29/393 358/1.18 |

FOREIGN PATENT DOCUMENTS

| JP | 2008-131483 | 6/2008 |
| JP | 2008-228114 | 9/2008 |
| JP | 2011-049999 | 3/2011 |

* cited by examiner

*Primary Examiner* — Barbara D Reinier
(74) *Attorney, Agent, or Firm* — Harness, Dickey and Pierce, P.L.C.

(57) ABSTRACT

An image forming apparatus includes an embedding device and an image output device. The embedding device is configured to embed a pair of identical electronic information in a pair of electronic embedment areas outside a print guarantee area and within a printable area of a recording medium. The pair of electronic embedment areas is along a pair of opposite sides of the recording medium. The image output device is configured to print out an image with the pair of identical electronic information embedded on the recording medium.

17 Claims, 10 Drawing Sheets

IMAGE FORMING APPARATUS CONFIGURED TO EMBED ELECTRONIC INFORMATION IN ELECTRONIC EMBEDMENT AREAS OUTSIDE A PRINT GUARANTEE AREA, IMAGE FORMING METHOD, AND NON-TRANSITORY COMPUTER-READABLE STORAGE MEDIUM

CROSS-REFERENCE TO RELATED APPLICATIONS

This patent application is based on and claims priority pursuant to 35 U.S.C. § 119(a) to Japanese Patent Application No. 2018-042176, filed on Mar. 8, 2018, in the Japan Patent Office, the entire disclosure of which is hereby incorporated by reference herein.

BACKGROUND

Technical Field

Embodiments of the present disclosure relate to an image forming apparatus, an image forming method, and a non-transitory computer-readable storage medium.

Related Art

In recent years, security on documents printed on paper has become important. To achieve the document security, there is known an electronic embedding technique for embedding electronic confidential information in a recording medium, as electronic embedded information.

Such information is desirably embedded in a margin area in which no image is printed to accurately read the electronic embedded information, in other words, to prevent misidentification of the electronic embedded information mixed with an image. However, accurately embedding the electronic information and identifying the embedded information has some difficulties due to changes in range of margin areas depending on the original image size, and due to narrow margin areas surrounding a photographic image, for example. One approach to such difficulties involves editing (e.g., downsizing) an original image to allocate a margin area enough to embed the electronic information.

SUMMARY

In one embodiment of the present disclosure, a novel image forming apparatus includes an embedding device and an image output device. The embedding device is configured to embed a pair of identical electronic information in a pair of electronic embedment areas outside a print guarantee area and within a printable area of a recording medium. The pair of electronic embedment areas is along a pair of opposite sides of the recording medium. The image output device is configured to print out an image with the pair of identical electronic information embedded on the recording medium.

Also described are novel image processing method and non-transitory, computer-readable storage medium storing computer-readable program code that causes a computer to perform the image forming method.

BRIEF DESCRIPTION OF THE DRAWINGS

A more complete appreciation of the embodiments and many of the attendant advantages and features thereof can be readily obtained and understood from the following detailed description with reference to the accompanying drawings, wherein.

The accompanying drawings are intended to depict embodiments of the present disclosure and should not be interpreted to limit the scope thereof. Also, identical or similar reference numerals designate identical or similar components throughout the several views.

DETAILED DESCRIPTION

Figure 1:
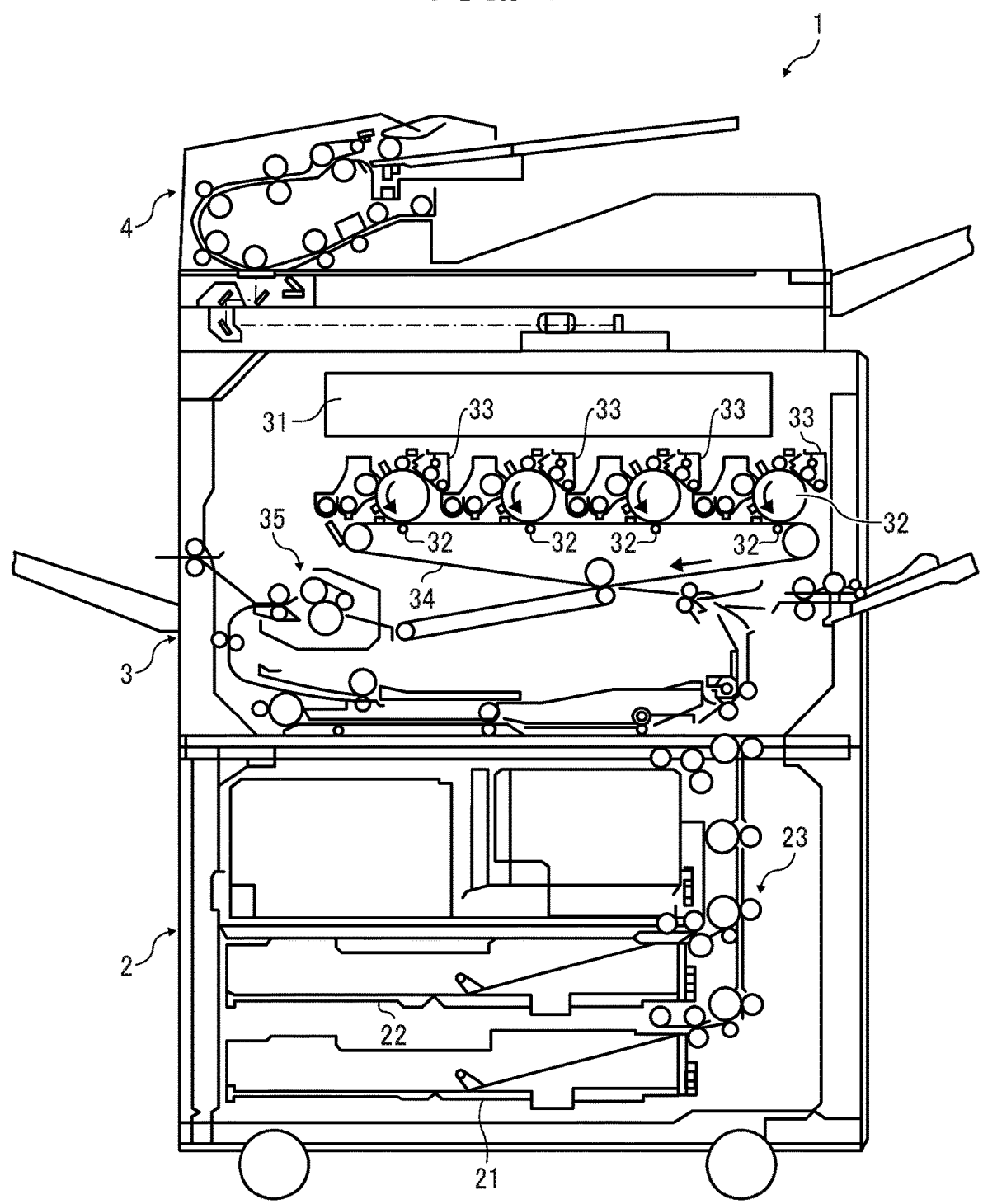
FIG. 1 is a schematic view of an image forming apparatus according to an embodiment of the present disclosure.

In describing embodiments illustrated in the drawings, specific terminology is employed for the sake of clarity. However, the disclosure of the present specification is not intended to be limited to the specific terminology so selected and it is to be understood that each specific element includes all technical equivalents that have a similar function, operate in a similar manner, and achieve a similar result.

Although the embodiments are described with technical limitations with reference to the attached drawings, such description is not intended to limit the scope of the disclosure and not all of the components or elements described in the embodiments of the present disclosure are indispensable to the present disclosure.

In a later-described comparative example, embodiment, and exemplary variation, for the sake of simplicity like reference numerals are given to identical or corresponding constituent elements such as parts and materials having the same functions, and redundant descriptions thereof are omitted unless otherwise required.

As used herein, the singular forms "a", "an", and "the" are intended to include the plural forms as well, unless the context clearly indicates otherwise.

Referring to the drawings, wherein like reference numerals designate identical or corresponding parts throughout the several views, embodiments of the present disclosure are described below.

CONFIGURATIONS

Figure 2:
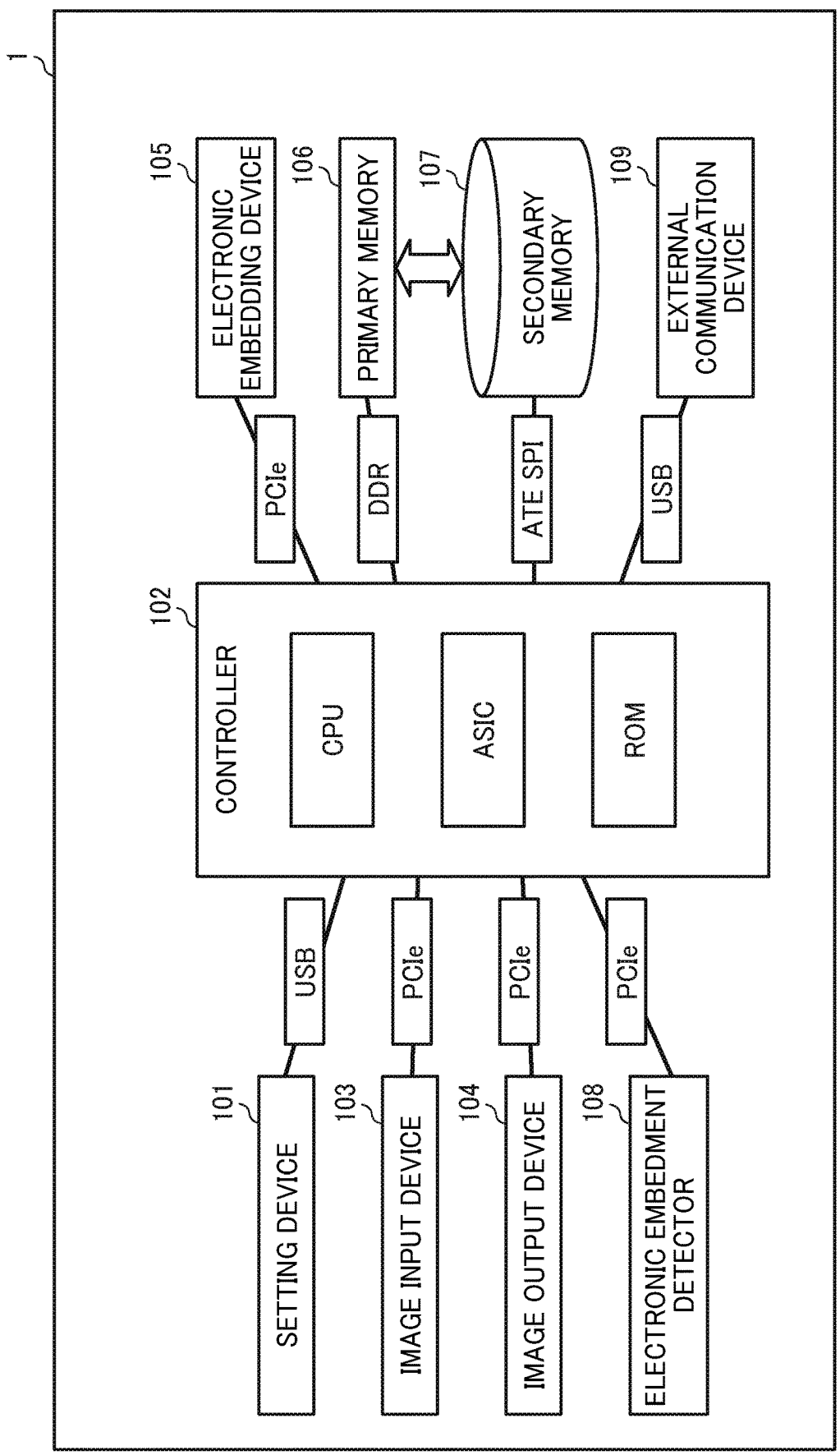
FIG. 2 is a block diagram illustrating an electrical hardware configuration of the image forming apparatus of FIG. 1.
Figure 3:
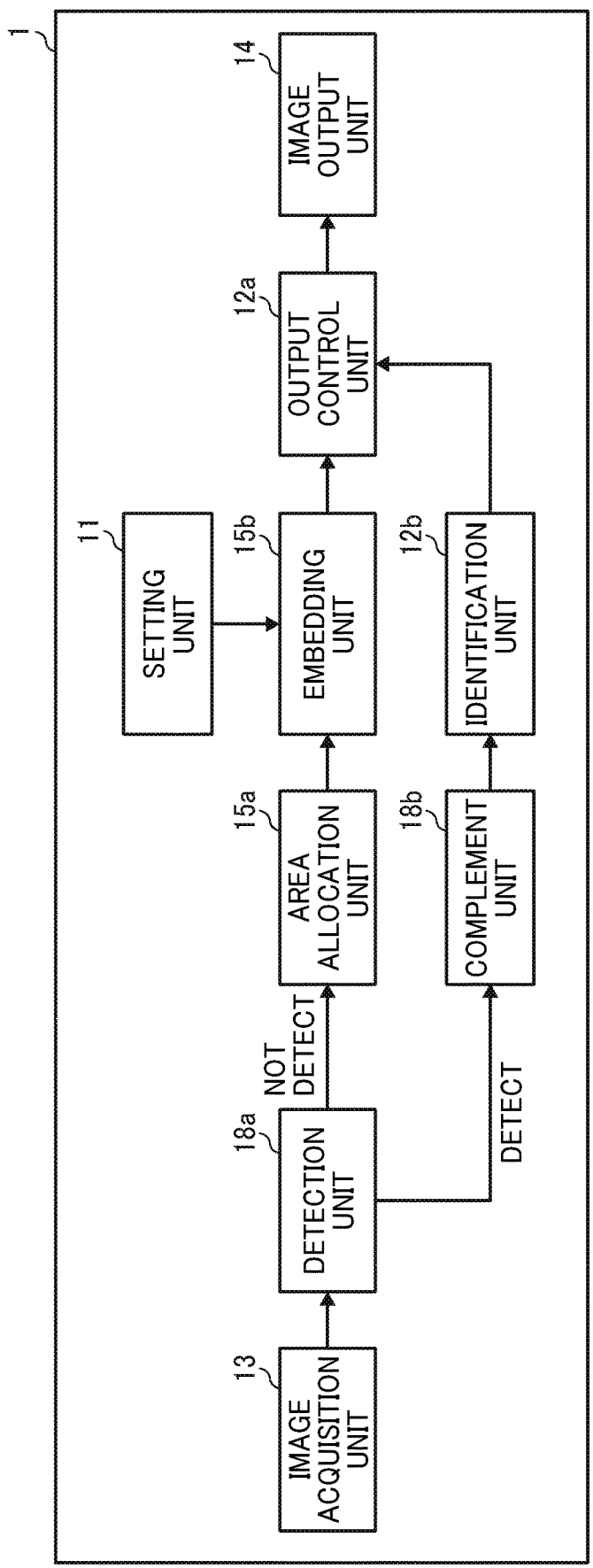
FIG. 3 is a functional block diagram illustrating a functional configuration of the image forming apparatus of FIG. 1.

Initially with reference to FIGS. 1 to 3, a description is given of configurations according to an embodiment of the present disclosure.

<Mechanical Hardware Configuration>

Referring now to FIG. 1, a description is given of a mechanical hardware configuration of an image forming apparatus 1 as an example of an image forming apparatus according to an embodiment of the present disclosure.

FIG. 1 is a schematic view of the image forming apparatus 1 according to the present embodiment of the present disclosure.

The image forming apparatus according to the embodiments of the present disclosure may be a copier, a facsimile machine, a printer, a multifunction peripheral (MFP) having at least two of copying, printing, scanning, facsimile, and plotter functions, or the like. The image forming apparatus 1 illustrated in FIG. 1 is an MFP as an example of the image forming apparatus according to the embodiments of the present disclosure. The image forming apparatus 1 includes a sheet feeder 2, an image forming device 3, and an image reader 4.

The sheet feeder 2 includes sheet trays 21 and 22, and sheet roller unit 23. Different sizes of recording media are placed on the sheet trays 21 and 22. The sheet roller unit 23 is constructed of a plurality of roller pairs that conveys the recording media from the sheet trays 21 and 22 to the image forming device 3 so that the image forming device 3 forms images on the recording media.

The image forming device 3 includes an exposure device 31, drum-shaped photoconductors 32, developing devices 33, a transfer belt 34, and a fixing device 35. In the image forming device 3, the exposure device 31 exposes the photoconductors 32 according to image data of an original read by an image input device 103 of the image reader 4, thereby forming latent images on the photoconductors 32. Note that a detailed description of the image input device 103 is deferred. The developing devices 33 supply different colors of toner to the respective photoconductors 32, thereby developing the latent images into visible toner images. Thus, different colors of toner images are formed on the respective photoconductors 32. Thereafter, in the image forming device 3, the toner images are transferred from the photoconductors 32 onto the transfer belt 34, and further transferred from the transfer belt 34 onto a recording medium conveyed from the sheet feeder 2. The fixing device 35 receives the recording medium bearing the toner images. The fixing device 35 melts toner contained in the toner images to fix the toner images, as a composite color toner image, onto the recording medium.

<Electrical Hardware Configuration>

Referring now to FIG. 2, a description is given of an electrical hardware configuration of the image forming apparatus 1 as an example of an image forming apparatus according to an embodiment of the present disclosure.

FIG. 2 is a block diagram illustrating an electrical hardware configuration of the image forming apparatus 1 described above.

The image forming apparatus 1 of the present embodiment includes a setting device 101, a controller 102, an image input device 103, an image output device 104, an electronic embedding device 105, a primary memory 106, a secondary memory 107, an electronic embedment detector 108, and an external communication device 109. Note that the image forming device 3 operates with the setting device 101, the controller 102, the image output device 104, the electronic embedding device 105, the primary memory 106, the secondary memory 107, the electronic embedment detector 108, and the external communication device 109. The image reader 4 operates with the controller 102 and the image input device 103.

The setting device 101 illustrated in FIG. 2 includes a touch panel and a hard key to display various kinds of messages for users and receive various kinds of settings according to user instructions, for example. The controller 102 manages information on such settings received by the setting device 101.

The controller 102 includes a central processing unit (CPU), an application specific integrated circuit (ASIC), and a read-only memory (ROM) to control the entire image forming apparatus 1. The image input device 103 reads an image of a document or an original with a scanner to acquire image data. According to the image data of the original read and acquired by the image input device 103, the image output device 104 exposes the photoconductors 32 to form latent images on the photoconductors 32 with the exposure device 31. Then, the image output device 104 supplies different colors of toner to the respective photoconductors 32 to develop the latent images into visible toner images with the developing devices 33. Thus, different colors of toner images are formed on the respective photoconductors 32. Thereafter, the image output device 104 transfers the toner images from the photoconductors 32 onto the transfer belt 34, and further transfers the toner images from the transfer belt 34 onto a recording medium conveyed from the sheet feeder 2. Then, with the fixing device 35, the image output device 104 melts toner contained in the toner images transferred onto the recording medium to fix the toner images, as a composite color toner image, onto the recording medium. Finally, the image output device 104 outputs the recording medium bearing the color toner image.

The electronic embedding device 105 embeds electronic information upon exposure performed by the exposure device 31 of the image output device 104. The primary memory 106 includes a random access memory (RAM) on which image data is loaded. The secondary memory 107 includes a hard disk drive (HDD) to store image data. The image data is retrievable from the secondary memory 107. The electronic embedment detector 108 detects electronic embedded information from the image data acquired by the image input device 103.

The external communication device 109 performs network communication with an external device. Note that a user determines where to hold a management record and an image log, specifically, inside the image forming apparatus 1 or with the external device. In a case in which the user determines to hold the management record and the image log with the external device, the external communication device 109 transmits the management record and the image log to the external device.

As illustrated in FIG. 2, each of the setting device 101 and the external communication device 109 is connected to the controller 102 via a universal serial bus (USB). Each of the image input device 103, the image output device 104, the electronic embedding device 105, and the electronic embedment detector 108 is connected to the controller 102 via a peripheral component interconnect express (PCIe). The primary memory 106 is connected to the controller 102 via a double data rate (DDR). On the other hand, the secondary memory 107 is connected to the controller 102 via an automatic test equipment serial peripheral interface (ATE SPI).

<Functional Configuration>

Referring now to FIG. 3, a description is given of a functional configuration of the image forming apparatus 1 as an image forming apparatus according to an embodiment of the present disclosure.

FIG. 3 is a functional block diagram illustrating a functional configuration of the image forming apparatus 1 described above.

With the devices illustrated in FIG. 2, the image forming apparatus 1 implements a setting unit 11, an output control unit 12a, an identification unit 12b, an image acquisition unit 13, an image output unit 14, an area allocation unit 15a, an embedding unit 15b, a detection unit 18a, and a complement unit 18b.

The setting unit 11 is mainly implemented by the setting device 101. The setting unit 11 receives various kinds of user settings to store and retrieve information on such settings in and from the secondary memory 107.

The image acquisition unit 13 is mainly implemented by the image input device 103 or the external communication device 109. The image acquisition unit 13 acquires image data.

The detection unit 18a is mainly implemented by the electronic embedment detector 108. The detection unit 18a detects electronic embedded information, which is electronic information embedded in an electronic embedment area described later. In addition, the detection unit 18a extracts all the electronic embedded information from the electronic embedment areas.

The area allocation unit 15a is mainly implemented by the electronic embedding device 105. In a case in which the detection unit 18a does not detect electronic embedded information, the area allocation unit 15a allocates two electronic embedment areas (or a pair of electronic embedment areas) outside a print guarantee area and within a printable area of a recording medium. The two electronic embedment areas are along opposite sides of the recording medium, respectively. In other words, the pair of electronic embedment areas is along a pair of opposite sides of the recording medium. Alternatively, the area allocation unit 15a may allocate four electronic embedment areas outside the print guarantee area and within the printable area on the recording medium. The four electronic embedment areas are along four sides of the recording medium, respectively.

As described above, the setting unit 11 is mainly implemented by the setting device 101. The setting unit 11 sets any one of three patterns or methods of embedding electronic information, according to user selection. The three patterns are hereinafter referred to as first to third setting patterns. The first setting pattern is a pattern for embedding identical electronic information in each of two electronic embedment areas along opposite sides of a recording medium, respectively. In other words, according to the first setting pattern, a pair of identical electronic information is embedded in a pair of electronic embedment areas along a pair of opposite sides of a recording medium. The second setting pattern is a pattern for embedding identical electronic information in each of four electronic embedment areas along four sides of a recording medium, respectively. The third setting pattern is a pattern for embedding identical electronic information A in each of two electronic embedment areas along opposite sides of a recording medium, respectively, while embedding identical electronic information B in each of two other electronic embedment areas along other opposite sides of the recording medium, respectively. In other words, according to the third setting pattern, a pair of identical electronic information A is embedded in a pair of electronic embedment areas along a pair of opposite sides of a recording medium; whereas a pair of identical electronic information B is embedded in another pair of electronic embedment areas along another pair of opposite sides of the recording medium. The electronic information A is different from the electronic information B.

The embedding unit 15b is mainly implemented by the electronic embedding device 105. Based on the setting pattern set by the setting unit 11, the embedding unit 15b embeds electronic information in each electronic embedment area of a recording medium.

The output control unit 12a is mainly implemented by the controller 102. The output control unit 12a controls the image output unit 14.

The image output unit 14 is mainly implemented by the image output device 104. The image output unit 14 prints out an image with an electronic information embedded on a recording medium.

The complement unit 18b is mainly implemented by the electronic embedment detector 108. In a case in which the detection unit 18a detects and extracts electronic embedded information, the complement unit 18b causes the electronic embedded information to complement each other, thereby completing identifiable electronic embedded information. In other words, the complement unit 18b generates complete electronic embedded information. Specifically, in a case in which an input original is a printed recording medium including electronic information embedded according to the first setting pattern, the complement unit 18b causes a pair of electronic information, which is embedded in a pair of electronic embedment areas along a pair of opposite sides of a recording medium, to complement each other, thereby completing the electronic embedded information. In other words, the complement unit 18b generates complete electronic embedded information. Alternatively, in a case in which an input original is a printed recording medium including electronic information embedded according to the second setting pattern, the complement unit 18b causes four pieces of electronic information embedded in all the four electronic embedding areas to complement each other, thereby completing the electronic embedded information. In other words, the complement unit 18b generate complete electronic embedded information. Alternatively, in a case in which an input original is a printed recording medium including electronic information embedded according to the third setting pattern, the complement unit 18b causes a pair of identical electronic information A, which is embedded in a pair of electronic embedment areas along a pair of opposite sides of a recording medium, to complement each other while causing a pair of electronic information B, which is embedded in another pair of electronic embedment areas along another pair of opposite sides of the recording medium, to complement each other, thereby completing the electronic embedded information A and the electronic embedded information B. In other words, the complement unit 18b generates complete electronic embedded information A and complete electronic embedded information B serving as first complete electronic information and second complete electronic information, respectively.

The identification unit 12b is mainly implemented by the controller 102. The identification unit 12b identifies the electronic embedded information complemented and completed by the complement unit 18b. In other words, the identification unit 12b identifies the complete electronic embedded information generated by the complement unit 18b. The identification of the complete electronic embedded information clarifies security contents and the like. In this case, the output control unit 12a controls the image output unit 14 based on the security contents and the like clarified. For example, the output control unit 12a does not cause the image output unit 14 to print out. As another example, the output control unit 12a causes the image output unit 14 to perform special printing including "confidential".

[Process/Operation]

Referring now to FIGS. 4 to 10, a description is given of a process and operation according to the present embodiment of the present disclosure.

<Overview of Process/Operation>

Figure 4:
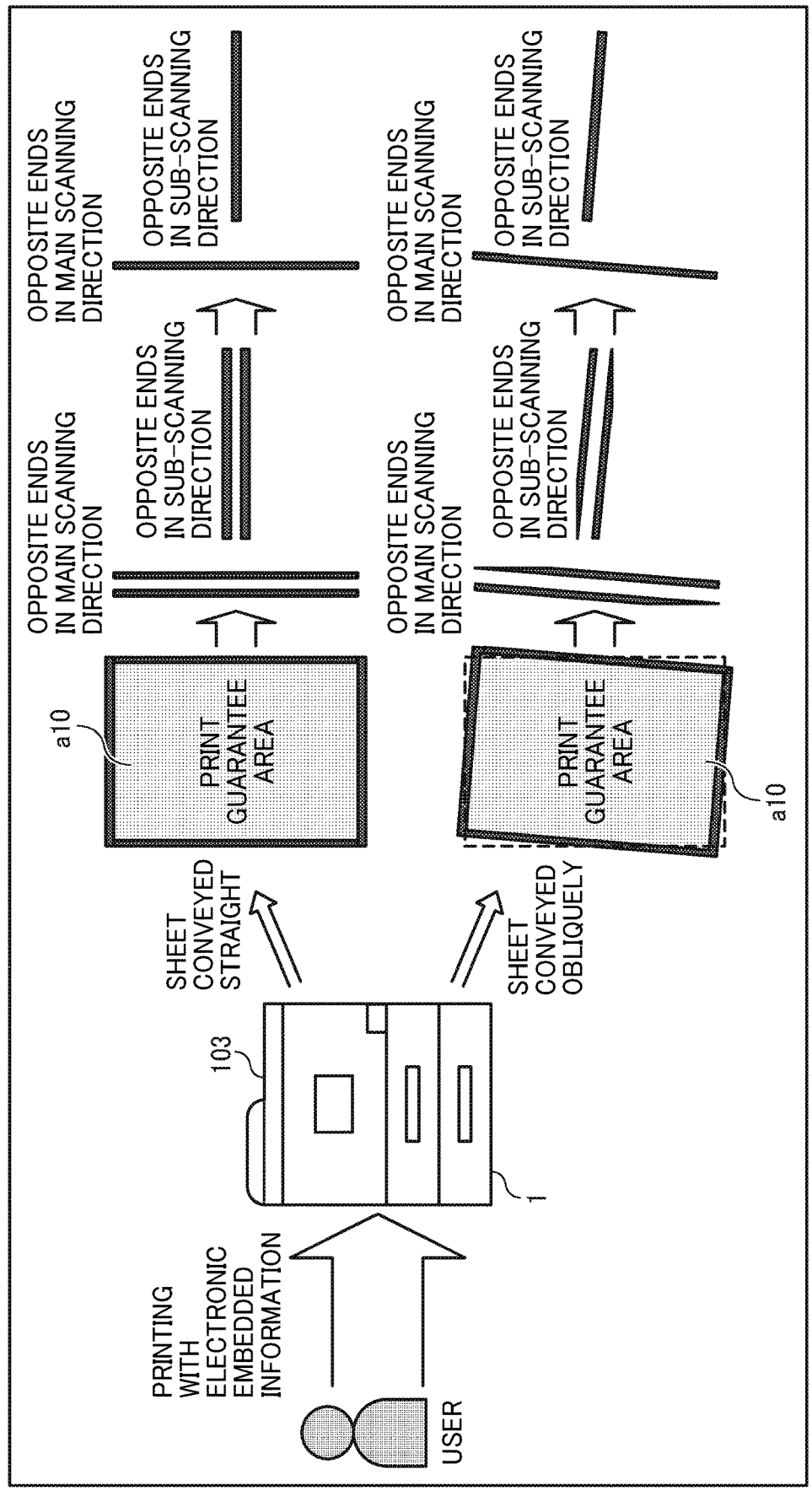
FIG. 4 is a schematic diagram illustrating a process and operation according to an embodiment of the present disclosure.

Initially with reference to FIG. 4, a description is given of an overview of the process and the operation according to the present embodiment of the present disclosure.

FIG. 4 is a schematic diagram illustrating the process and the operation according to the present embodiment of the present disclosure.

Normally, in order to address expansion of an image outside a recording medium in various cases, a "print guarantee area" (illustrated as a print guarantee area a10 in FIG. 4) is allocated within a "printable area", to enable the image to be printed inside the recording medium. An image read from an original (e.g., manuscript paper) is printed within the print guarantee area. In the present embodiment, electronic information is embedded outside the print guarantee area and inside the printable area. Accordingly, the electronic information is reliably embedded without editing the original image, regardless of user settings. In addition, a pair of identical electronic information is embedded outside the print guarantee area, in a pair of opposite end areas of a recording medium. Accordingly, even in a case in which one of the pair of identical electronic embedded information is insufficient, the pair of identical electronic embedded information of the pair of opposite ends of the recording medium is extracted to complement each other upon detection. As a consequence, complete electronic embedded information is detected.

In FIG. 4, in response to user setting of printing with electronic embedded information, the image forming apparatus 1 performs printing while embedding electronic information at opposite ends of a recording medium in a main scanning direction and at opposite ends of the recording medium in a sub-scanning direction when the recording medium is conveyed straight in the image forming apparatus 1. When the image forming apparatus 1 reads a recording medium including electronic embedded information as an original, the image forming apparatus 1 detects the electronic information embedded at one end of the recording medium in the main scanning direction and at one end of the recording medium in the sub-scanning direction.

On the other hand, in FIG. 4, an oblique conveyance of a recording medium in the image forming apparatus 1 may miss a part of the electronic embedded information while the image forming apparatus 1 performs printing with electronic information embedded at opposite ends of the recording medium in the main scanning direction and at opposite ends of the recording medium in the sub-scanning direction. When the image forming apparatus 1 reads a recording medium including electronic embedded information as an original, the image forming apparatus 1 causes insufficient electronic embedded information to complement each other at the opposite ends of the recording medium in the main scanning direction. Similarly, the image forming apparatus 1 causes insufficient electronic embedded information to complement each other at the opposite ends of the recording medium in the sub-scanning direction.

<Print Guarantee Area/Electronic Embedment Area>

Figure 5:
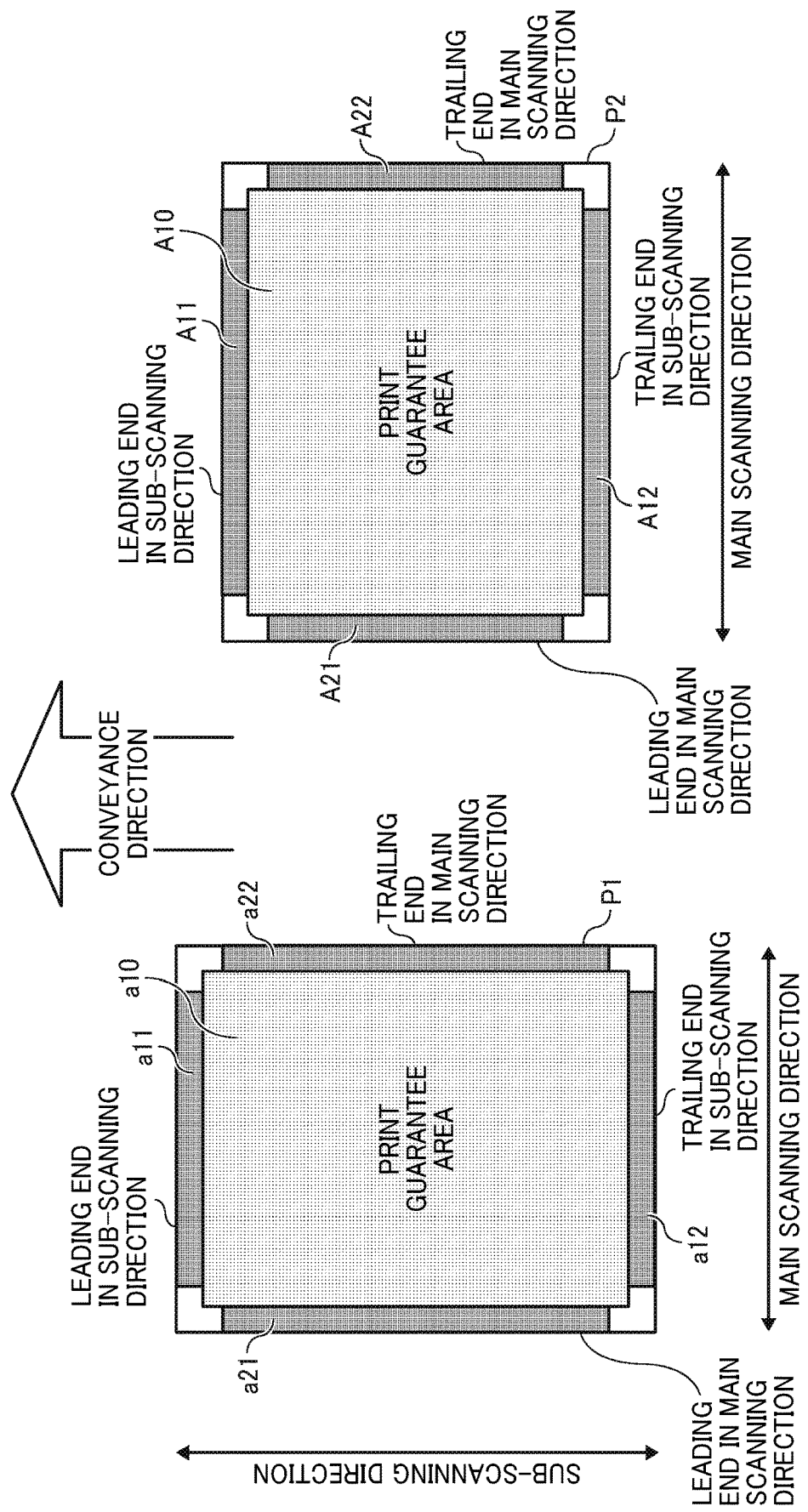
FIG. 5 is an illustration of print guarantee areas and electronic embedment areas.

Referring now to FIG. 5, a description is given of the print guarantee area and the electronic embedment area.

FIG. 5 is an illustration of print guarantee areas and electronic embedment areas of recording media P1 and P2.

FIG. 5 illustrates each of the entire recording media P1 and P2 as a printable area. Four outer-side areas of the recording medium P1 include electronic embedment areas a11, a12, a21, and a22. The print guarantee area a10 is an inner-side area of the recording medium P1. In other words, the print guarantee area a10 is inside the electronic embedment areas a11, a12, a21, and a22 on the recording medium P1. The electronic embedment areas a11 and a12 may be hereinafter referred to as a pair of electronic embedment areas a11 and a12. Similarly, the electronic embedment areas a21 and a22 may be hereinafter referred to as a pair of electronic embedment areas a21 and a22.

On the other hand, four outer-side areas of the recording medium P2 include electronic embedment areas A11, A12, A21, and A22. A print guarantee area A10 is an inner-side area of the recording medium P2. In other words, the print guarantee area A10 is inside the electronic embedment areas A11, A12, A21, and A22 on the recording medium P2. The electronic embedment areas A11 and A12 may be hereinafter referred to as a pair of electronic embedment areas A11 and A12. Similarly, the electronic embedment areas A21 and A22 may be hereinafter referred to as a pair of electronic embedment areas A21 and A22. Four corners of the recording medium P1 are printable areas but outside the print guarantee area a10. In short, the four corners of the recording medium P1 are not electronic embedment areas. Similarly, four corners of the recording medium P2 are printable areas but outside the print guarantee area A10. In short, the four corners of the recording medium P2 are not electronic embedment areas.

The print guarantee area described above is an eigenvalue determined by an engine mounted on an actual machine. In other words, different models have different print guarantee areas. Relatedly, margin portions outside the print guarantee area are set depending on the model. The margin portions outside the print guarantee area include four areas in a leading end in the main scanning direction, a training end in the main scanning direction, a leading end in the sub-scanning direction, and a trailing end in the sub-scanning direction, respectively. There is a lower limit for the margin portion settings. The margin portions are not specified as print guarantee areas. However, the margin portions are printable areas. In the present embodiment, the margin portions outside the print guarantee area are allocated as electronic embedment areas. Accordingly, the electronic information is reliably embedded without editing the original image, regardless of user settings.

However, since the margin portions are outside the print guarantee area, a non-printed, undetectable area may occur when the recording medium is conveyed obliquely. To address such a situation, in the present embodiment, four empty or margin areas excluding predetermined four corner areas of the recording medium P1 are allocated as the electronic embedment areas a11, a12, a21, and a22. As illustrated in FIG. 5, the recording medium P1 is conveyed along a conveyance direction that is parallel to a longitudinal direction of the recording medium P1. On the other hand, four empty or margin areas excluding predetermined four corner areas of the recording medium P2 are allocated as the electronic embedment areas A11, A12, A21, and A22. As illustrated in FIG. 5, the recording medium P2 is conveyed along the conveyance direction that is perpendicular to a longitudinal direction of the recording medium P2. Each of the predetermined four corner areas of the recording medium P1 is an L-shaped area having one-eighth of each of vertical and lateral side lengths of the recording medium P1, for example. Similarly, each of the predetermined four corner areas of the recording medium P2 is an L-shaped area having one-eighth of each of vertical and lateral side lengths of the recording medium P2, for example. Thus, in the present embodiment, the four corner areas of a recording medium (e.g., P1, P2) are not allocated as electronic embedment areas, thereby preventing a part of the electronic embedded information from missing. A pair of electronic embedded information at opposite ends (i.e., opposite sides) of a recording medium is identical information. For example, in the image forming apparatus 1, identical electronic information is printed in the electronic embedment areas a11 and a12 at opposite ends (i.e., opposite sides) of the recording medium P1. Note that undetectable areas at the four corners of a recording medium is determined based on a worst deviated angle of recording medium conveyance examined at a design stage of an applicable machine.

In a rare case, a recording medium might be conveyed extremely obliquely. In such a case, simply excluding the four corners of the recording medium from electronic embedment areas might fail to print electronic embedded information. To address such a situation, in the image forming apparatus 1 of the present embodiment, a pair of identical electronic embedded information is printed in a pair of electronic embedment areas at opposite sides of a recording medium. Even in a case in which the electronic embedded information is insufficient, the pair of identical electronic embedded information complements each other at the opposite side ends of the recording medium. As a consequence, the image forming apparatus 1 detects complete electronic embedded information.

Figure 6:
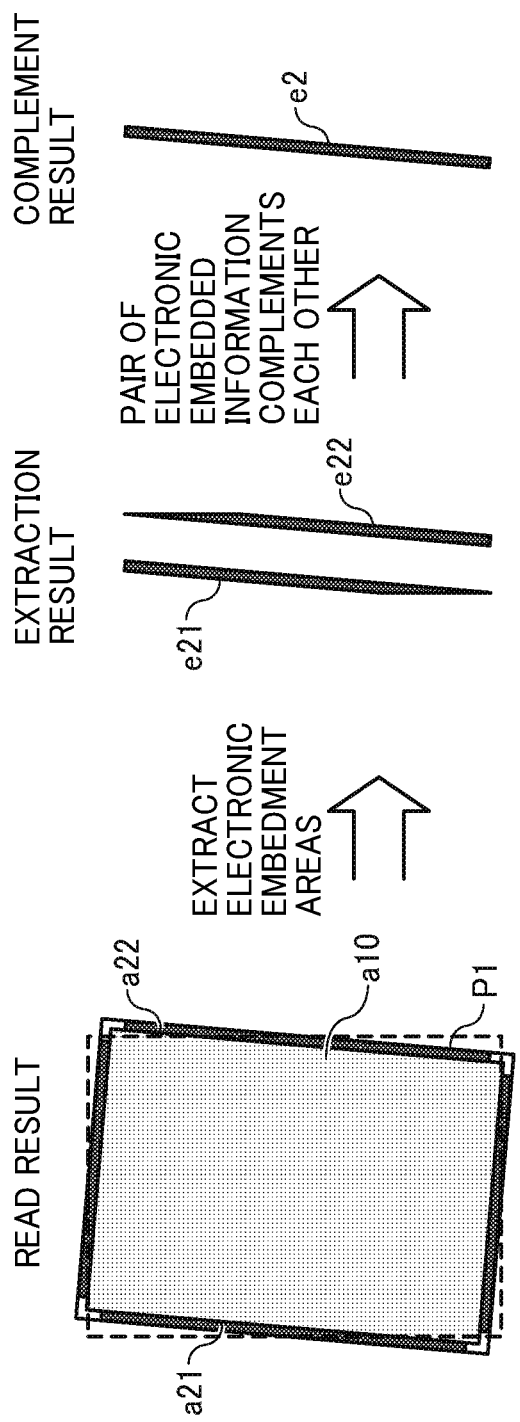
FIG. 6 is a schematic diagram illustrating a process of detecting electronic information.

Referring now to FIG. 6, a description is given of an overview of a process of detecting electronic embedded information (at opposite ends in the main scanning direction, for example).

FIG. 6 is a schematic diagram illustrating the process of detecting electronic embedded information (at opposite ends in the main scanning direction, for example).

In the image forming apparatus 1 of the present embodiment, the electronic information is embedded outside the print guarantee area. Therefore, in a case in which a recording medium is conveyed obliquely at the time of printing, a lack of the electronic embedded information might hamper identification of the electronic embedded information. To address such a situation, upon detection in the image forming apparatus 1, a pair of identical electronic information e21 and e22 embedded in the pair of electronic embedment areas a21 and a22 is extracted. The pair of electronic embedment areas a21 and a22 is located outside the print guarantee area a10 and along the opposite side ends of the recording medium P1. The pair of identical electronic information e21 and e22 thus extracted complements each other, resulting in complete electronic embedded information e2.

A pair of electronic embedded information is complementable at the opposite ends of a recording medium to be a complete electronic embedded information, in a case of allowable angular deviation of recording medium conveyance. That is, the complement results in no missing electronic embedded information. Accordingly, complete electronic embedded information is detected and acquired. When the recording medium is conveyed straight, the complement enhances detection accuracy. As an algorithm upon complement, a total embedding amount is calculated based on initial embeddable information. The image forming apparatus 1 acquires an amount of information detectable from the extraction results at the opposite side ends of the recording medium. The image forming apparatus 1 detects embedded pattern portions similarly with respect to overlapping target portions such that a total value becomes the total embedding amount calculated. The image forming apparatus 1 overlaps the portions, thereby executing the complement.

<Setting of Embedding Electronic Information>

Figure 7:
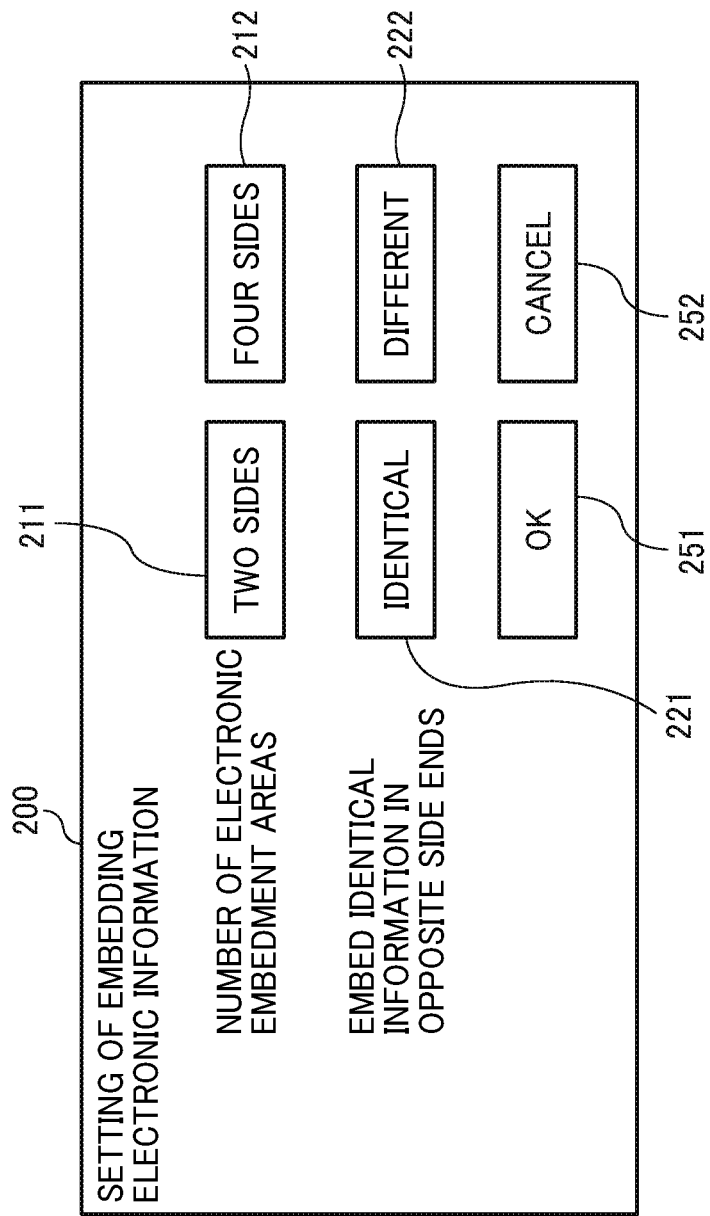
FIG. 7 is a view of a setup screen for setting of embedding electronic information.

Referring now to FIG. 7, a description is given of setting of embedding electronic information.

FIG. 7 is a view of a setup screen for setting of embedding electronic information.

The setting unit 11 displays a setup screen 200 for setting of embedding electronic information as illustrated in FIG. 7. On the setup screen 200, "TWO SIDES" button 211 and "FOUR SIDES" button 212 are displayed for selecting the number of electronic embedment areas into which electronic information is embedded on a recording medium. For example, a user selection of the "TWO SIDES" button 211 sets electronic information to be embedded in the pair of electronic embedment areas a11 and a12 at opposite side ends of the recording medium P1 illustrated in FIG. 5. As another example, a user selection of the "FOUR SIDES" button 212 sets electronic information to be embedded in the pair of electronic embedment areas a11 and a12 at the opposite side ends of the recording medium P1 and in the other pair of electronic embedment areas a21 and a22 at the other opposite side ends of the recording medium P1 illustrated in FIG. 5.

In addition, on the setup screen 200, "IDENTICAL" button 221 and "DIFFERENT" button 222 are displayed for selecting whether to embed identical electronic information in the electronic embedment areas at opposite side ends of a recording medium. For example, a user selection of the "TWO SIDES" button 211 and the "IDENTICAL" button 221 sets the identical electronic information A to be embedded in the pair of electronic embedment areas a11 and a12 at the opposite side ends illustrated in FIG. 5. Such embedment of identical electronic information enhances accuracy of detecting electronic embedded information.

Note that, according to the specification, a user is unable to select the "TWO SIDES" button 211 and the "DIFFERENT" button 222 at the same time. This is because two pieces of different electronic embedded information are incapable of complementing each other at opposite sides of a recording medium.

A user selection of the "FOUR SIDES" button 212 and the "IDENTICAL" button 221 sets identical electronic information to be embedded in all the electronic embedment areas, that is, in the pair of electronic embedment areas a11 and a12 at the opposite side ends of the recording medium P1 and in the other pair of electronic embedment areas a21 and a22 at the other opposite side ends of the recording medium P1 illustrated in FIG. 5, for example.

A user selection of the "FOUR SIDES" button 212 and the "DIFFERENT" button 222 sets the identical electronic information A to be embedded in the pair of electronic embedment areas a11 and a12 at the opposite side ends of the recording medium P1 while setting the identical electronic information B in the other pair of electronic embedment areas a21 and a22 at the other opposite side ends of the recording medium P1 as illustrated in FIG. 5, for example.

An "OK" button 251 is pressed by, e.g., a user when the user confirms the selections described above. When the "OK" button 251 is pressed, the setting unit 11 sets embedment of electronic information. A "CANCEL" button 252 is pressed by, e.g., a user when the user cancels the selections described above.

<Process of Embedding Electronic Information>

Figure 8:
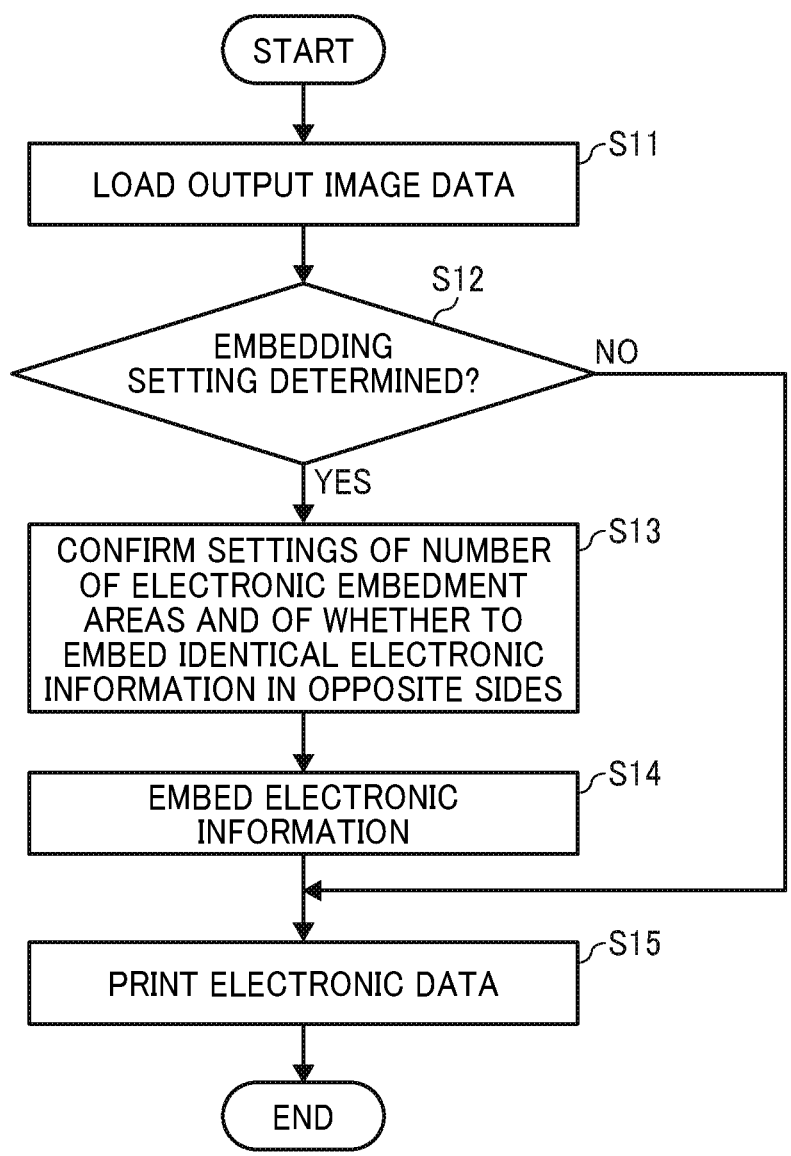
FIG. 8 is a flowchart of a process of outputting a recording medium including a process of embedding electronic information.

Referring now to FIG. 8, a description is given of a process of outputting a recording medium including a process of embedding electronic information.

FIG. 8 is a flowchart of the process of outputting a recording medium including the process of embedding electronic information.

In the image forming apparatus 1, in step S11, the embedding unit 15b load output image data on the primary memory 106.

In step S12, the embedding unit 15b determines whether the setting unit 11 determines embedding setting, that is, how to embed electronic information. More specifically, in step S12, the embedding unit 15b determines whether the setting unit 11 determines one of the setting patterns for embedding electronic information described above.

When the embedding unit 15b determines that the setting unit 11 determines the setting pattern (YES in step S12), the embedding unit 15b confirms settings of the number of electronic embedment areas and of whether to embed identical electronic information in opposite sides of a recording medium in step S13.

In step S14, the embedding unit 15b embeds electronic information in the image data based on contents or settings confirmed in step S13.

In step S15, the output control unit 12a causes the image output unit 14 to print out an image on the recording medium according to the image data in which the electronic information is embedded (i.e., image data with electronic embedded information).

On the other hand, when the embedding unit 15b determines that the setting unit 11 does not determine the setting pattern (NO in step S12), the process proceeds to step S15.

<Process of Acquiring Electronic Embedded Information>

Figure 9:
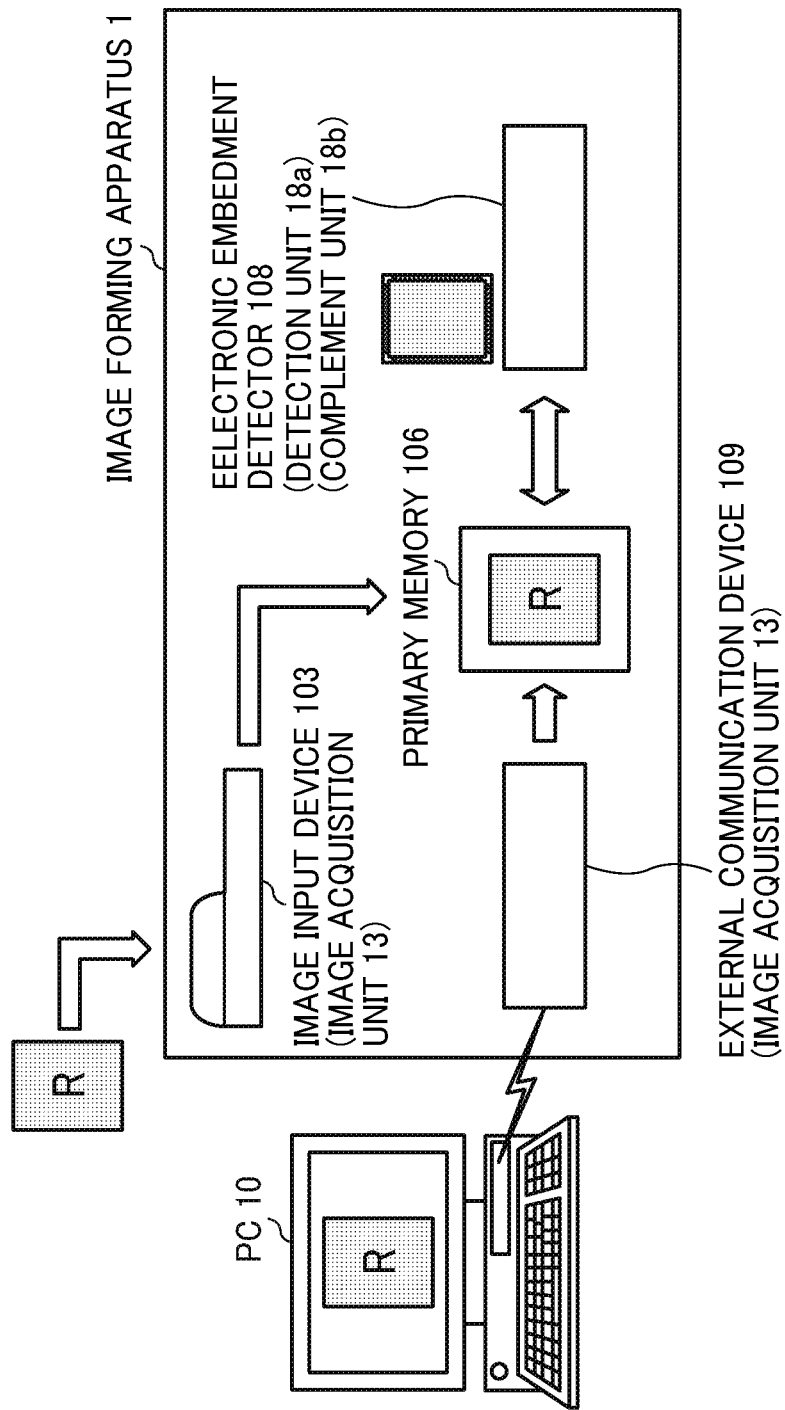
FIG. 9 is an illustration of a process of acquiring electronic embedded information.
Figure 10:
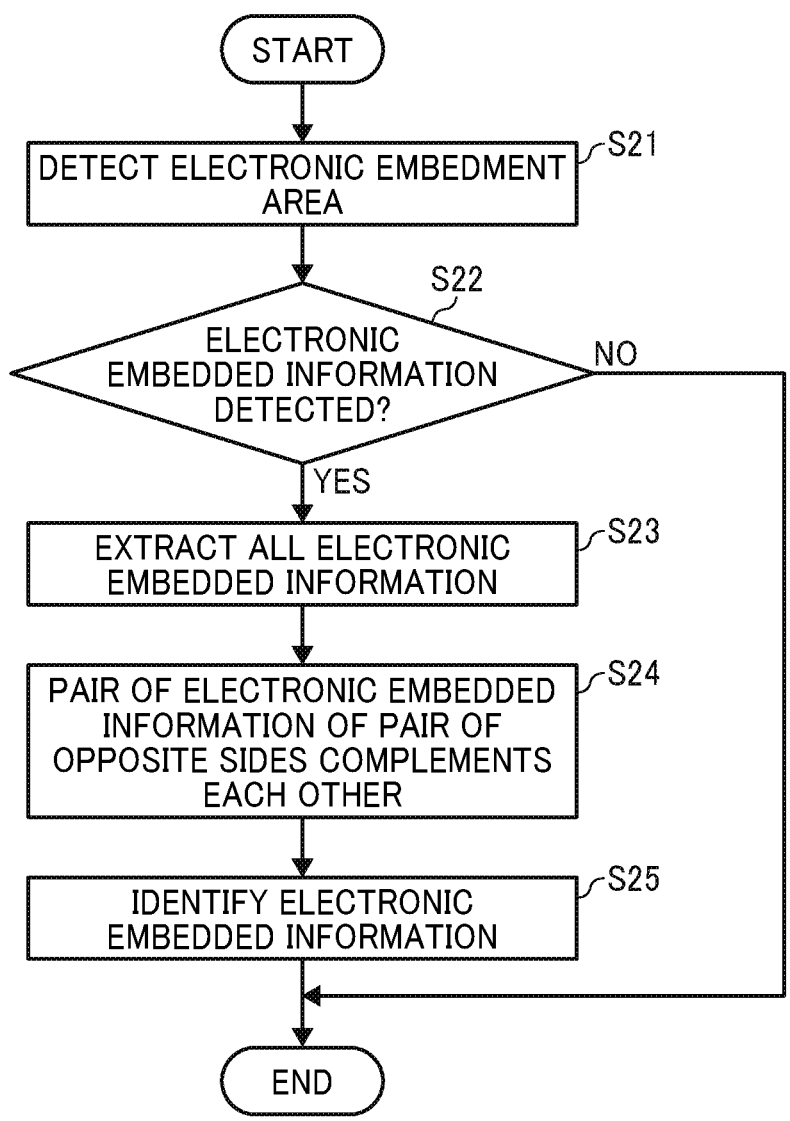
FIG. 10 is a flowchart of the process of acquiring electronic embedded information.

Referring now to FIGS. 9 and 10, a description is given of a process of acquiring electronic embedded information.

FIG. 9 is an illustration of the process of acquiring electronic embedded information. FIG. 10 is a flowchart of the process of acquiring electronic embedded information.

As illustrated in FIG. 9, the image forming apparatus 1 scans an image of a recording medium with the image input device 103 (i.e., image acquisition unit 13), thereby acquiring image data R. Alternatively, with the external communication device 109 (i.e., image acquisition unit 13), the image forming apparatus acquires image data R from a computer, such as a personal computer (PC) 10, which is an external information processing apparatus. The image data R thus acquired is temporarily stored in the primary memory 106. In this state, the process of acquiring electronic embedded information is executed as illustrated in FIGS. 9 and 10.

Referring to FIG. 10, in step S21, the detection unit 18a detects whether electronic information is embedded in the electronic embedment areas corresponding to the four sides of a recording medium (e.g., recording media R1 and R2 illustrated in FIG. 5) on which an image is printed according to the image data R. The detection unit 18a is capable of detecting an invisible pattern. In addition, the detection unit 18a is capable of detecting specific information according to pattern combinations.

When the detection unit 18a detects electronic embedded information (YES in step S22), the detection unit 18a extracts all the electronic embedded information from the electronic embedment areas in step S23.

In step S24, the complement unit 18b causes a pair of identical electronic embedded information of a pair of opposite sides to complement each other, thereby completing the electronic embedded information. In other words, the complement unit 18b generates complete electronic embedded information.

In step S25, the identification unit 12b identifies the electronic embedded information completed by the complement. In other words, the identification unit 12b identifies the complete electronic embedded information.

On the other hand, when the detection unit 18a does not detect electronic embedded information (NO in step S22), the process illustrated in FIG. 10 ends. In this case, the process is followed by a process performed by the area allocation unit 15a.

Advantages of Embodiments

As described above, according to the present embodiment, the image forming apparatus 1 embeds the two pieces of identical electronic information e21 and e22 in the two electronic embedment areas a21 and a22, respectively. In other words, the image forming apparatus 1 embeds the pair of identical electronic information e21 and e22 in the pair of electronic embedment areas a21 and a22. The two electronic embedment areas a21 and a22 are located along opposite two sides of a recording medium, respectively. More specifically, the two electronic embedment areas a21 and a22 are located outside the print guarantee area and within the printable area of the recording medium. In short, the image forming apparatus 1 embeds electronic information outside the print guarantee area in which an image is printed. Accordingly, the image forming apparatus 1 embeds the electronic information without editing the image. Even in a case in which the recording medium is conveyed obliquely in the image forming apparatus 1, the image forming apparatus 1 causes the embedded pair of identical electronic information e21 and e22 to complement each other to generate the complete electronic embedded information e2. Since the image forming apparatus 1 identifies the complete electronic embedded information e2, the image forming apparatus 1 reliably identifies the electronic embedded information.

According to the embodiments described above, electronic information is embedded so as to be accurately identified without editing an original image.

Although the present disclosure makes reference to specific embodiments, it is to be noted that the present disclosure is not limited to the details of the embodiments described above. Thus, various modifications and enhancements are possible in light of the above teachings, without departing from the scope of the present disclosure. It is therefore to be understood that the present disclosure may be practiced otherwise than as specifically described herein. For example, elements and/or features of different embodiments may be combined with each other and/or substituted for each other within the scope of the present disclosure. The number of constituent elements and their locations, shapes, and so forth are not limited to any of the structure for performing the methodology illustrated in the drawings.

Any one of the above-described operations may be performed in various other ways, for example, in an order different from that described above.

Any of the above-described devices or units can be implemented as a hardware apparatus, such as a special-purpose circuit or device, or as a hardware/software combination, such as a processor executing a software program.

Further, each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field programmable gate array (FPGA) and conventional circuit components arranged to perform the recited functions.

Further, as described above, any one of the above-described and other methods of the present disclosure may be embodied in the form of a computer program stored on any kind of storage medium. Examples of storage media include, but are not limited to, floppy disks, hard disks, optical discs, magneto-optical discs, magnetic tapes, nonvolatile memory cards, read only memories (ROMs), etc.

Alternatively, any one of the above-described and other methods of the present disclosure may be implemented by the ASIC, prepared by interconnecting an appropriate network of conventional component circuits or by a combination thereof with one or more conventional general-purpose microprocessors and/or signal processors programmed accordingly.

What is claimed is:

1. An image forming apparatus comprising:
    an embedding device configured to embed a pair of identical electronic information in a pair of electronic embedment areas outside a print guarantee area and within a printable area of a recording medium, the pair of electronic embedment areas being along a pair of opposite sides of the recording medium;
    an image output device configured to print out an image with the pair of identical electronic information embedded on the recording medium;
    a detector configured to detect electronic information embedded in an electronic embedment area, the electronic information including the pair of identical electronic information, the electronic embedment area including the pair of electronic embedment areas, and to cause the pair of identical electronic information, detected by the detector, to complement each other to generate first complete electronic embedded information; and
    circuitry configured to identify the complete electronic embedded information, and to control image output based on the complete electronic embedded information identified.

2. The image forming apparatus according to claim 1, wherein the embedding device is configured to embed the pair of identical electronic information in another pair of electronic embedment areas along another pair of opposite sides of the recording medium.

3. The image forming apparatus according to claim 1, wherein the embedding device is configured to embed a plurality of identical electronic information in a plurality of electronic embedment areas excluding four corner areas of the recording medium,
    wherein the plurality of identical electronic information includes the pair of identical electronic information and the plurality of electronic embedment areas include the pair of electronic embedment area.

4. The image forming apparatus according to claim 1, wherein the embedding device is configured to embed another pair of identical electronic information different from the pair of identical electronic information in another pair of electronic embedment areas along another pair of opposite sides of the recording medium.

5. The image forming apparatus according to claim 4, wherein the embedding device is configured to embed the pair of identical electronic information and said another pair of identical electronic information in a plurality of electronic embedment areas excluding four corner areas of the recording medium, and
    wherein the plurality of electronic embedment areas includes the pair of electronic embedment areas and said another pair of electronic embedment areas.

6. The image forming apparatus according to claim 4, wherein
    the electronic information includes the pair of identical electronic information and said another pair of identical electronic information, and the electronic embedment area includes the pair of electronic embedment areas and said another pair of electronic embedment areas;
    the complete electronic embedded information includes first complete electronic embedded information and second complete electronic embedded information, the first complete electronic embedded information generated by causing the pair of identical electronic information, detected by the detector, to complement each other, and the second complete electronic embedded information generated by causing said another pair of identical electronic information, detected by the detector, to complement each other; and
    the circuitry configured to:
        identify the first complete electronic embedded information and the second complete electronic embedded information; and
        control the image output based on the first complete electronic embedded information and the second complete electronic embedded information identified.

7. An image forming method comprising:
    embedding a pair of identical electronic information in a pair of electronic embedment areas outside a print guarantee area and within a printable area of a recording medium, the pair of electronic embedment areas being along a pair of opposite sides of the recording medium;
    printing out an image with the pair of identical electronic information embedded on the recording medium;
    detecting electronic information embedded in an electronic embedment area, the electronic information including the pair of identical electronic information, the electronic embedment area including the pair of electronic embedment areas;
    causing the pair of identical electronic information, detected by the detecting, to complement each other to generate complete electronic embedded information;
    identifying the complete electronic embedded information; and
    controlling image output based on the complete electronic embedded information identified.

8. The image forming method according to claim 7, wherein the embedding embeds the pair of identical electronic information in another pair of electronic embedment areas along another pair of opposite sides of the recording medium.

9. The image forming method according to claim 7, wherein the embedding embeds a plurality of identical electronic information in a plurality of electronic embedment areas excluding four corner areas of the recording medium,
    wherein the plurality of identical electronic information includes the pair of identical electronic information and the plurality of electronic embedment areas include the pair of electronic embedment areas.

10. The image forming method according to claim 7,
wherein the embedding embeds another pair of identical electronic information different from the pair of identical electronic information in another pair of electronic embedment areas along another pair of opposite sides of the recording medium.

11. The image forming method according to claim 10,
wherein the embedding embeds the pair of identical electronic information and said another pair of identical electronic information in a plurality of electronic embedment areas excluding four corner areas of the recording medium, and
wherein the plurality of electronic embedment areas includes the pair of electronic embedment areas and said another pair of electronic embedment areas.

12. The image forming method according to claim 10, wherein
the electronic information includes the pair of identical electronic information and said another pair of identical electronic information, and the electronic embedment area includes the pair of electronic embedment areas and said another pair of electronic embedment areas;
the complete electronic embedded information includes first complete electronic embedded information and second complete electronic embedded information, the first complete electronic embedded information generated by causing the pair of identical electronic information, detected by the detecting, to complement each other, and the second complete electronic embedded information generated by causing said another pair of identical electronic information, detected by the detecting, to complement each other;
the identifying includes identifying the first complete electronic embedded information and the second complete electronic embedded information; and
the controlling includes controlling image output based on the first complete electronic embedded information and the second complete electronic embedded information identified.

13. A non-transitory, computer-readable storage medium storing computer-readable program code that causes a computer to perform an image forming method, the method comprising:
embedding a pair of identical electronic information in a pair of electronic embedment areas outside a print guarantee area and within a printable area of a recording medium, the pair of electronic embedment areas being along a pair of opposite sides of the recording medium;
printing out an image with the pair of identical electronic information embedded on the recording medium
detecting electronic information embedded in an electronic embedment area, the electronic information including the pair of identical electronic information, the electronic embedment area including the pair of electronic embedment areas;
causing the pair of identical electronic information, detected by the detecting, to complement each other to generate complete electronic embedded information;
identifying the complete electronic embedded information; and
controlling image output based on the complete electronic embedded information identified.

14. The non-transitory, computer-readable storage medium according to claim 13,
wherein the embedding embeds the pair of identical electronic information in another pair of electronic embedment areas along another pair of opposite sides of the recording medium.

15. The non-transitory, computer-readable storage medium according to claim 13, wherein the embedding embeds a plurality of identical electronic information in a plurality of electronic embedment areas excluding four corner areas of the recording medium,
wherein the plurality of identical electronic information includes the pair of identical electronic information and the plurality of electronic embedment areas include the pair of electronic embedment areas.

16. The non-transitory, computer-readable storage medium according to claim 13,
wherein the embedding embeds another pair of identical electronic information different from the pair of identical electronic information in another pair of electronic embedment areas along another pair of opposite sides of the recording medium.

17. The non-transitory, computer-readable storage medium according to claim 16,
wherein the embedding embeds the pair of identical electronic information and said another pair of identical electronic information in a plurality of electronic embedment areas excluding four corner areas of the recording medium, and
wherein the plurality of electronic embedment areas includes the pair of electronic embedment areas and said another pair of electronic embedment areas.

* * * * *